United States Patent [19]

Parsons

[11] 4,018,406
[45] Apr. 19, 1977

[54] REDUNDANT BLOWER DRIVE FOR PRESSURIZED HOT AIR AIRSHIP

[75] Inventor: Roger R. Parsons, Sioux Falls, S. Dak.

[73] Assignee: Raven Industries, Inc., Sioux Falls, S. Dak.

[22] Filed: Apr. 12, 1976

[21] Appl. No.: 676,246

[52] U.S. Cl. .................................. 244/98; 244/30
[51] Int. Cl.² ...................................... B64B 1/58
[58] Field of Search .............. 244/30, 31, 96, 97, 244/98, 128

[56] References Cited
UNITED STATES PATENTS 7,207    3/1850    Bell ................................ 244/30

Primary Examiner—Trygve M. Blix
Assistant Examiner—Barry L. Kelmachter
Attorney, Agent, or Firm—Hill, Gross, Simpson, Van Santen, Steadman, Chiara & Simpson

[57] ABSTRACT

A thermal airship including an elongate gas envelope of a soft flexible material with tail members on the aft end of the airship, a gondola carried below the airship hull, a first motor driving a propeller for propelling the airship horizontally, a pressurizing inflation leading into the hull, an air pressure generating mechanism for pressurizing the envelope with heated air during flight including a blower driven by a second motor positioned for moving a flow of air through the opening with a controlled burner positioned in the path of the flowing air, a drive train connected between the first motor and blower and a drive train clutch in the drive train for connecting the blower to be driven by the first motor in the event of failure of the second motor.

8 Claims, 2 Drawing Figures

U.S. Patent
April 19, 1977
4,018,406
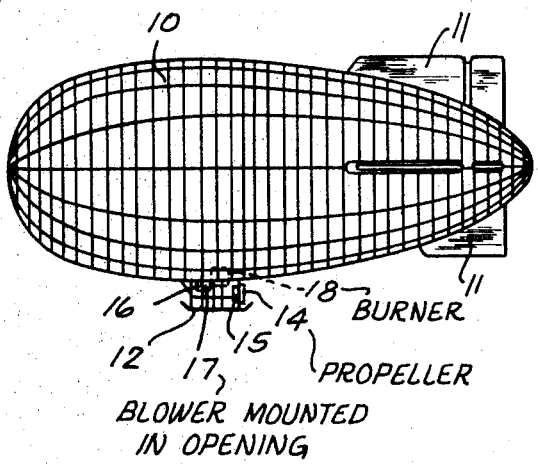
Fig-1
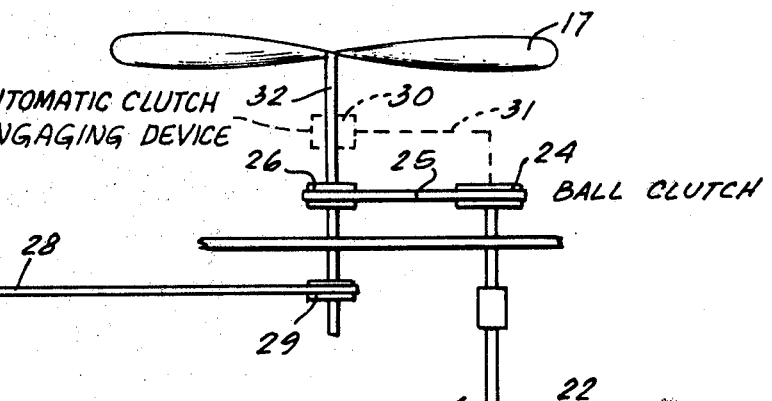
Fig-2
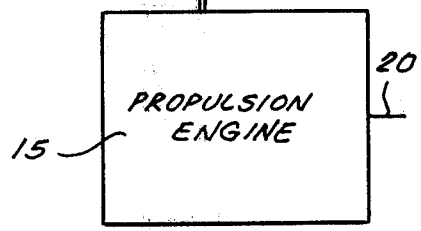

REDUNDANT BLOWER DRIVE FOR PRESSURIZED HOT AIR AIRSHIP

BACKGROUND OF THE INVENTION

The invention relates to improvements in powered airships, and more particularly to a powered airship having a flexible envelope inflated and superpressurized by hot air, capable of directed flight for transporting loads over distances and provided with an improved more safe superpressurizing mechanism.

Airships of this type have been referred to as dirigibles and originally referred to as blimps when the airship is nonrigid. The present invention in particular relates to a hot air inflated airship of the nonrigid pressure type. The main envelope or pressure hull is formed of a fabric such as a laminated plastic and Dacron, or of suitable other material which is lightweight, high temperature resistant, extremely strong and impermeable to gas leakage. The envelope of the airship is horizontally elongate and is primarily symmetrical with load lines distributed over the body of the envelope for carrying a payload therebelow. The load lines are also particularly arranged to support hot gas pressure inflation means which preferably will be in the form of one or more propane fueled burners with a fan inflation means. The fan or blower which pressurizes the airship is driven by a suitable motor which may be propane or gasoline fueled. The airship also carries a propelling engine driving a propeller in order to travel in controlled horizontal flight.

The plastic fabric envelope when not in use can be folded and shipped or stored in the space which takes up less than 1 percent of its inflated volume. The envelope can be relatively rapidly inflated by the operation of the fan and the free lift is controllable by control of the burner which controls the temperature of the air within the envelope. The direction of flight is controlled by tail fins at the aft end of the airship envelope. These tail surfaces preferably include a rigid or stable portion which stabilizes the airship in horizontal flight, and a manipulable portion which changes the direction of flight. Vertically extending control surfaces are pivoted to the left or right to change the direction of flight, and horizontally extending surfaces move up or down to cause the airship to ascend or descend. Primarily, the temperature of the hot air within the airship is controlled to provide sufficient lift for the weight of the envelope and the payload being carried so that essentially free lift is present while the airship is in flight, and it ascends or descends in accordance with the change in angle of the control tail surfaces.

It is important that the airship envelope remain under superpressure, and for this purpose the blower operates continually. The burner is operated intermittently to maintain the temperature of the air within the airship at a predetermined level to provide the free lift needed to carry the payload. Even if the burner should become inoperative for some purpose, if the soft enevelope of the hull can be maintained rigid by the superpressure, the airship can land because the heat loss is gradual and does not occur that rapidly. It is also desirable that the amount of weight carried by the airship be maintained at a minimum, and therefore, auxiliary motors or engines are undesirable. It is, however, critical that the pressurizing blower keep operating, and the failure of the drive motor for the blower could be disastrous.

It is accordingly an object of the present invention to provide a safety arrangement whereby the pressurizing blower for the airship continues operating so that the airship can remain superpressurized in all circumstances.

A further object of the invention is to provide a safety arrangement whereby an auxiliary drive is provided for the superpressurizing blower without necessitating provision of extra unnecessary equipment to add weight to the load carried by the airship.

A further object of the invention is to provide an improved drive arrangement whereby in the event of failure of the blower motor, the blower can be kept operating by the propelling motor so that the airship can be safely landed for repair.

Other objects, advantages and features will become more apparent with the teaching of the principles of the present invention in connection with the disclosure of the preferred embodiment in the specification, claims and drawings, in which:

DRAWINGS

FIG. 1 is an elevational view of a thermal airship pressurized and powered in accordance with the principles of the present invention; and FIG. 2 is a somewhat schematic illustration illustrating the equipment for pressurizing and propelling the airship.

DESCRIPTION

As illustrated in FIG. 1, a thermal airship is shown formed of a soft flexible material such as a reinforced Dacron cut in gores, seamed to each other, to provide an elongate aerodynamic shape airship envelope 10.

The envelope at its aft end carries tail surfaces 11 which are arranged to be controllable so as to be able to control the horizontal flight of the airship. Movement of the vertical movable tail surfaces will guide the airship to the left or right and movement of the horizontal tail surfaces will direct the airship up or down. Control cables for these tail surfaces are led down through the interior of the hull to a gondola 12 which is suspended below the hull. One way in which the gondola may be supported is by vertical cables secured within the airship envelope at the top of the hull and extending downwardly to connect to the gondola.

The gondola carries the instruments and controls and pilot for operating the ship, and carries the payload. Supported on the gondola are means for propelling the airship horizontally in its travel and also means for heating and pressurizing the airship envelope.

For filling the envelope to a superpressure with heated air, a hot air generating means is provided. This generating means is kept operating during the entire flight, and particularly the means for delivering the air to the interior with the pressure so that the envelope will retain its aerodynamic shape. In the event of accidental extinguishing of the burner, the heat loss will be at a gradual rate so that if the envelope is maintained pressurized, the pilot can guide it to the ground for repair of the burner.

For driving the airship, a propeller 14 is driven by a first engine 15 through a propeller shaft shown at 20 in FIG. 2. The first engine 15 is provided with a power take-off, shown generally at 21 and connects through a drive train 23 to the fan or blower 17 for pressurizing the airship envelope. The drive train is disconnected during normal operation with the blower driven by the second motor 16 which is connected to solely drive the blower. The blower or fan motor 16 has a centrifugal clutch 26 connected in its drive train to the blower 17 and the centrifugal clutch includes a pulley with a belt 28 driving a pulley 29 on the shaft 32 of the blower 17.

The auxiliary drive train 23 includes a flexible shaft 22 leading from the power take-off which connects to a ball clutch 24. The ball clutch connects by means of a belt 25 to a pulley 26 of the blower shaft 32. During normal operation, both the first motor 15 for the propeller and the second motor 16 for the blower operate continually. The blower motor may be in the form of a 5 horsepower gasoline engine, and the propeller motor is of larger capacity, such as 10 horsepower, to be able to drive both the blower and propeller. A fuel supply is carried on the gondola. In the event of failure of the blower engine 16, the operator engages the ball clutch 24 so that the blower continues operation. The centrifugal clutch 27 will automatically disconnect so that the propulsion engine 15 does not have to additionally drive the blower engine.

During normal operation, when both engines are operating properly, the ball clutch 24 is disconnected so that the drive train 23 does not interfere with normal operation.

Connection of the ball clutch 24 may be done manually by the operator, who will immediately notice failure of the blower engine, or it may be done automatically. Such automatic device, such as shown at 30 may be connected to the blower shaft 32, and the device 30 through an electrical connection 31, will automatically engage the ball clutch 24 if the blower slows down, indicating failure of the blower engine 16. The automatic clutch operating device 30 may be also connected directly to the blower motor 16 to operate automatically when it fails. While a preferred form of arrangement is illustrated, particularly for the drive train 23 utilizing a flexible shaft, it will be understood that other forms of drives and other forms of clutches may be employed. The utilization of the propulsion engine 15 in a dual safety function avoids accidental depressurizing of the airship envelope and permits the airship to be safely guided to the ground for repair in the event of failure of the blower engine 16. In the event of the propulsion engine 16 failing, the pilot can still guide the airship to glide to the ground by manipulation of the tail surfaces, for repair of the propulsion engine. Thus, the arrangement does not detract from the normal function of either of the engines but provides a safety arrangement capable of adding additional insurance to the reliability of the airship flight.

I claim as my invention:

1. A thermal airship comprising in combination:
   an elongate gas envelope of soft flexible material being aerodynamic shaped for horizontal flight providing a hull for the airship;
   tail members on the aft end of the airship for controlling the horizontal flight;
   a gondola carried below the hull for supporting a payload;
   a first motor driving a propeller for propelling the airship horizontally being supported by the hull;
   means defining a pressurizing inflation opening leading into the hull;
   hot air pressure generating means for pressurizing the soft envelope with heated air during flight including a blower carried on the hull driven by a second motor and positioned for moving a flow of air through the opening for inflating the envelope with a superpressure;
   a controlled burner positioned in the path of air flow heating the air passing into the envelope interior;
   a drive train connected between said first motor and said blower;
   and drive train clutch means in said drive train for connecting the blower to be driven by the first motor in the event of failure of the second motor whereby the airship will remain pressurized.

2. A thermal airship constructed in accordance with claim 1;
   including a blower clutch between the second motor and the blower so that the drive connection between the second motor and blower can be disconnected in the event of failure of the second motor so that it will not be driven by the first motor.

3. A thermal airship constructed in accordance with claim 2:
   including means for automatically disconnecting the blower clutch with failure of the second motor.

4. A thermal airship constructed in accordance with claim 1:
   including means for automatically engaging said clutch means with failure of the second motor.

5. A thermal airship constructed in accordance with claim 2:
   wherein said blower clutch is a centrifugal clutch and automatically disconnects with failure of the second motor.

6. A thermal airship constructed in accordance with claim 3:
   wherein the clutch means is a ball clutch.

7. A thermal airship constructed in accordance with claim 1:
   wherein the drive between the second motor and blower includes a belt passing over sheaves.

8. A thermal airship constructed in accordance with claim 1:
   wherein said drive train includes a belt passing over sheaves.

* * * * *